Patented June 1, 1948

2,442,638

UNITED STATES PATENT OFFICE 2,442,638

THICK PROTECTIVE COATINGS ON PERMANENT MAGNETS

Paul P. Cioffi, Summit, N. J., assignor to Bell Telephone Laboratories, Incorporated, New York, N. Y., a corporation of New York Application September 1, 1943, Serial No. 500,782

11 Claims. (Cl. 175—21)

This invention relates to permanent magnets and more particularly to the protection of permanent magnets from the adverse effect of accidental engagement with magnetizable materials. An object of this invention is the improvement of permanent magnets. A more particular object of this invention is the protection of permanent magnets against loss of field strength due to accidental contact with magnetizable materials.

Applications of permanent magnets are well known in the art in which it is important that the magnetic field produced by the magnet remain stable. Variations in the field strength or field uniformity of permanent magnets in such applications will detrimentally affect the operation of the mechanism of which the magnet forms a part.

In the case of certain powerful permanent magnets capable of producing field strengths of great intensities, it has been found that mechanisms of which they form a part at times operated erratically and unpredictably. The reason for this was not understood and the use of mechanisms comprising permanent magnets having field strength of large intensity, particularly in the performance of operations where failure of the mechanism is hazardous, was growing in disfavor. Applicant discovered that the difficulty could be caused by accidental contact between the permanent magnets having fields of high intensity and magnetizable materials such as workmen's tools, etc., while the apparatus was being assembled. It was found that in the case of magnets having high field strengths, accidental contact with iron and steel tools, for instance, would cause a substantial drop in field strength, as well as a tendency to diminish the uniformity of the field. After extended observation and study, applicant found that a permanent magnet, whatever its field intensity, remained substantially stable as to intensity and uniformity of field if the magnet were completely and effectively isolated. It was discovered further that in the case of magnets having fields of great intensity, it is not necessary that there be actual contact between the magnet and other magnetizable materials in order to change both the field strength and the field position, but that these are altered when magnetizable materials are brought near them. Specifically, it was found that if a bar of iron (and especially a pointed instrument) were brought within a range of one-eighth inch to six inches (depending upon the size and intensity of the magnet), the strength and position of fields of permanent magnets of exceedingly high field strengths were altered and remained changed until the magnet was again remagnetized by introducing it into a magnetic field of proper strength.

In accordance with this invention, therefore, permanent magnets are coated with non-magnetic materials such as aluminum. The thickness of the coating ranges upwardly from one-eighth inch to six inches depending upon the strength of the magnetic field of the magnet, size and shape of the magnet and other factors.

Reference is made to the patent to Sturtevant 2,236,277, dated March 25, 1941, which discloses a permanent magnet having a copper-plated shield thereon to protect the magnet against the adverse effect caused by lightning discharges. The copper is used as a conductor which serves both to protect the magnet against the discharge and as a conductor in an alarm circuit which functions to indicate the condition. The copper plating is relatively thin, however, and magnets having field intensities in the range of the magnets contemplated in the invention herein require coatings of much greater thickness to afford protection against the change in field strength and position caused by the introduction of magnetizable materials. In the preferred embodiment of the invention, a coating of aluminum having a thickness ranging from one-eighth inch to six inches is applied. However, the material of the coating is not so limited and it has been found that a wrapping of felt, rubber tape or other non-magnetic material of the same thickness, namely, from one-eighth inch to six inches, is equally effective. However, where an aluminum or other metal coating is used, it is possible to adapt the metallic coating or an extension thereof so as to serve for rigidly supporting other portions of the apparatus which cooperate in the mechanism.

A feature of the invention is a thick coating of aluminum on a permanent magnet.

A further feature of the invention is a thick coating of felt on a permanent magnet.

A further feature of the invention is a thick coating of non-magnetizable material on a permanent magnet.

A further feature of the invention is the adaption of the non-magnetizable coating of the magnet to the support of apparatus units cooperating with the magnet in the specific mechanism in which the magnet is employed.

A further feature of the invention is the separability of each of the permanent magnet horns from the yoke to facilitate testing and selection of the individual horns as well as to make them more portable.

These and other features of the invention may be understood from reference to the associated drawing in which.

Figure 1:
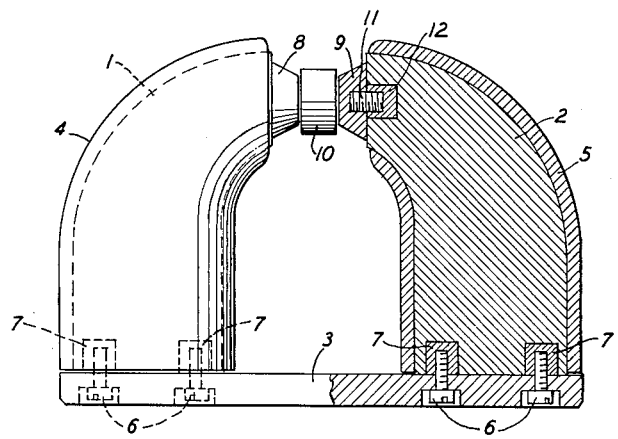
Fig. 1 shows a vertical elevation of a permanent magnet partly in section coated with a metallic non-magnetizable material.

Refer now to Fig. 1 which shows the horns 1 and 2 made of permanent magnetic material magnetized to form permanent magnets and the connecting middle portion or yoke 3 of a permanent magnet assembly of high field intensity. The yoke is secured to the horns by screws 6 which engage with steel inserts 7. The pole-pieces 8 and 9 are secured to the horns by headless set screws such as 11 which engage steel inserts such as 12 in the horns. A keeper 10 is shown positioned between the poles when the magnet is not in use. Metallic coatings 4 and 5 of non-magnetizable material, such as aluminum, completely cover the horns of the magnet with the exception of an area in close proximity with the poles which may be left uncovered. The thickness of the coatings ranges from one-eighth inch up to six inches. It has been found that a coating of less than one-eighth inch in thickness is ineffective; further, for certain applications where the field intensity is high and the requirement of stability of field intensity and field position very rigid, that thicknesses as great as six inches may be required.

Figure 2:
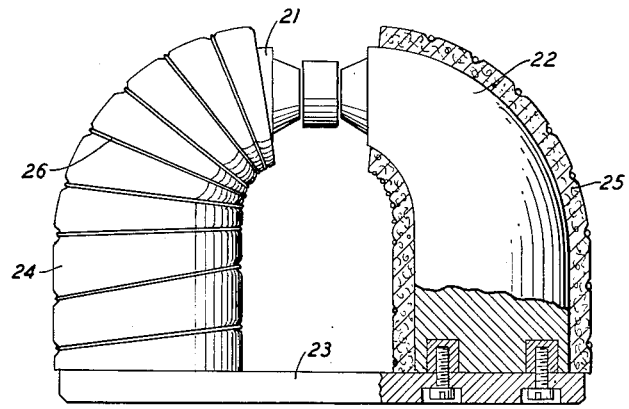
Fig. 2 shows a vertical elevation of the permanent magnet partly in section coated with a non-metallic, non-magnetizable material.

Refer now to Fig. 2. This shows a separate embodiment of the invention in which a wrapping of non-metallic material such as felt rather than non-magnetizable metallic material such as aluminum as shown in Fig. 1 is employed for the coating. The horns of the magnets 21 and 22, which are joined together by the connecting middle portion on yoke 23 are completely covered in a wrapping of felt 24 and 25 secured by a binder 26. In this case, as in the embodiment per Fig. 1, the thickness of the felt covering ranges from one-eighth inch up to six inches.

Figure 3:
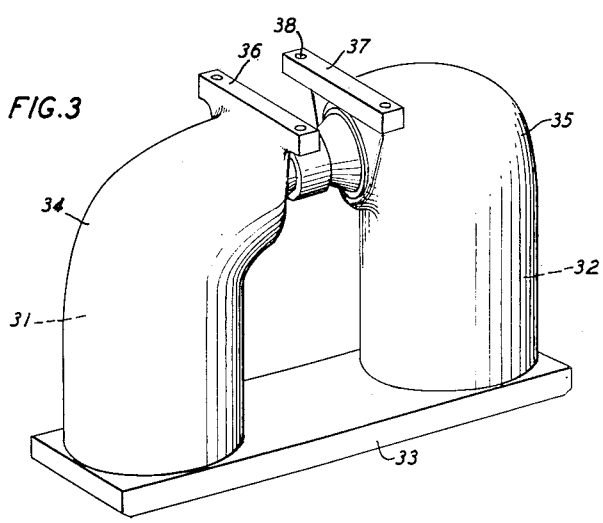
Fig. 3 shows a perspective view of the permanent magnet having a metallic coating adapted to rigidly support an apparatus element which cooperates with the magnet in a particular mechanism.

Refer now to Fig. 3. This embodiment discloses an arrangement in which the metallic coating of the horns of the magnet is adapted to serve as a rigid support for apparatus which cooperates with the magnet in the particular mechanism. In this figure, the horns of the magnets 31 and 32 are connected by a middle portion or yoke 33. The horns of the magnets are covered with a metallic coating 34 and 35. The upper right-hand portion of the metallic coating of horn 31 is extended upwardly toward the right and shaped so as to form a rectangular platform or boss 36, the top surface of which is horizontal. A corresponding platform or boss 37 is formed in the metallic coating 35. Vertical holes such as 38 may be clear drilled or drilled and tapped in the platform to accommodate screws or bolts. The apparatus unit which cooperates with the magnet in the particular mechanism may be secured to the two platforms 36 and 37 by means of screws or bolts. In a particular application of the invention, a space discharge device is to be secured to and supported by the platform. In other applications, other apparatus units will be so disposed. It is to be understood that the manner of securing the cooperating apparatus unit to the metallic coating is susceptible to a wide range of variations to suit particular conditions.

In practicing the invention, in the case wherein metallic coatings are employed, aluminum coatings cast on the magnetic material are preferred but the invention is not limited to this particular metal coating nor to this method of applying it to the magnetic material.

What is claimed is:

1. Two horn-shaped elements of permanent magnetic alloy magnetized to form permanent magnets of very high magnetic field intensity, said field intensity not knocked down, interconnected by a yoke to form a substantially U-shaped permanent magnet, a cast metallic coating of non-magnetizable material encircling each of said horns individually substantially throughout the length of said horns, said coating having a thickness ranging from three-eighths inch up to six inches to stabilize the intensity and position of the magnetic field of said magnet.

2. A permanent magnet, a non-metallic coating encircling individually each of two horns of magnetic alloy forming part of said magnet, said alloy magnetized to very high intensity and not knocked down, said coating having a thickness ranging from three-eighths inch to six inches to stabilize the intensity and position of the magnetic field of said magnet.

3. A permanent magnet, a metallic coating thereon of non-magnetizable material, said coating having a thickness ranging from one-eighth inch to six inches and said coating including means for mounting an apparatus element.

4. A permanent magnet, comprising two horns of magnetic alloy magnetized to a very high intensity, a sleeve of non-magnetizable metallic material cast on each of said horns individually, each of said sleeves exceeding three-eighths inch in thickness, said horns interconnected by a yoke, and individual extensions of said sleeves arranged to support an apparatus unit.

5. A permanent magnet comprising two horns interconnected by a yoke, said magnet having a field strength of very great intensity and not knocked down, and a non-magnetizable shield encircling individually each of said two horns on said magnet, said shield protecting a space extending outward laterally from said horns to a distance not less than six inches from said horns from invasion by magnetisable materials, to stabilize the magnitude and position of the magnetic field of said magnet.

6. Two individual elements of magnetic alloy magnetized to form permanent magnets having a field strength of very high intensity and not knocked down, individual invasion shields of non-magnetic material covering the surface of each of said elements substantially throughout the length of each of said elements, said shields having a thickness of at least three-eighths inch to prevent changes in the intensity and position of the magnetic fields of said elements caused by the introduction of magnetizable materials into the surrounding space in proximity with said elements, a yoke, two pole-pieces, and securing means for forming said elements, said yoke and said pole-pieces into a single permanent magnet.

7. A system for protecting a permanent magnet, magnetized to substantially its maximum coercivity and not knocked down, against variation in the magnitude and disposition of its magnetic field comprising a substantially U-shaped permanent magnet formed of two horns and a yoke, a non-magnetizable metallic sleeve cast on each of said horns individually, said sleeve exceeding three-eighths inch in thickness, to protect the area in proximity with said horns from invasion by magnetizable material, to insure stability of the magnetic field of said magnet.

8. A system for protecting a permanent magnet, magnetized to substantially its maximum coercivity and not knocked down, against variation in the magnitude and disposition of its magnetic field comprising a substantially U-shaped permanent magnet formed of two horns and a yoke, a non-metallic coating encircling each of said horns individually, said coating exceeding two inches in thickness, to protect the area in proximity with said horns from invasion by magnetizable material, to insure stability of the magnetic field of said magnet.

9. A system for protecting a permanent magnet against variation in the magnitude and disposition of its magnetic field comprising a substantially U-shaped permanent magnet formed of two horns and a yoke, a cast metallic coating of non-magnetizable material, inseparable from each of said horns, encircling each of said horns individually, said coating exceeding one inch in thickness, to protect the area in proximity with each of said horns from invasion by magnetizable material, to insure stability of the magnetic field of said magnet.

10. A permanent magnet, said magnet having a magnetic field of very high intensity which has not been knocked down, said magnet subject to a substantial impairment of said field intensity due to the invasion of the proximate space about said magnet by magnetizable material, without actual contact between said magnet and said material, said impairment persisting after the withdrawal of said material from said space and a non-magnetizable invasion shield not less than three-eighths inch in thickness about said magnet throughout the length of said magent to prevent said invasion and said impairment.

11. A permanent magnet, said magnet having a magnetic field of very high intensity which has not been knocked down, said magnet subject to a substantial impairment of said field intensity due to the invasion of the proximate space about said magnet by magnetizable material, without actual contact between said magnet and said material, said impairment persisting after the withdrawal of said material from said space, and a non-magnetizable invasion shield exceeding one inch in thickness about said magnet throughout the length of said magnet to prevent said invasion and said impairment.

PAUL P. CIOFFI.

REFERENCES CITED

The following references are of record in the file of this patent:

UNITED STATES PATENTS

| Number | Name | Date |
| --- | --- | --- |
| Re. 20,291 | Bock | Mar. 9, 1937 |
| 1,595,801 | McDonald | Aug. 10, 1926 |
| 1,947,920 | Primrose | Feb. 20, 1934 |
| 2,179,625 | Groden | Nov. 14, 1939 |
| 2,236,277 | Sturtevant | Mar. 25, 1941 |
| 2,240,035 | Catherall | Apr. 29, 1941 |

FOREIGN PATENTS

| Number | Country | Date |
| --- | --- | --- |
| 498,714 | Great Britain | Jan. 12, 1939 |